United States Patent Office 3,117,882
Patented Jan. 14, 1964

3,117,882
PROCESS FOR COLORING INORGANIC
CEMENTITIOUS MATERIALS
Robert J. Herschler and Rainer G. Jaffe, Camas, Wash., and James W. Kay, West Covina, Calif., assignors to The Harshaw Chemical Company, Cleveland, Ohio, a corporation of Ohio, and Crown Zellerbach Corporation, San Francisco, Calif., a corporation of Nevada
No Drawing. Filed Nov. 7, 1960, Ser. No. 67,489
12 Claims. (Cl. 106—90)

This invention relates to a process for coloring inorganic cementitious materials and especially to the production of colored constructional materials such as cement, gypsum, lime and the like. The type of cementitious material with which the present invention is concerned normally comprises a finely divided, hydratable material which has had the water of hydration partly driven off by heating and it may contain one or more inert materials.

It is an object of the present invention to facilitate and improve the incorporation of a color pigment into such materials.

Another object of this invention is to provide a process for making colored cementitious materials wherein the coloring efficiency of the pigment is materially increased.

The present invention is concerned with the use in the manufacture of various inorganic materials of a coloring composition comprising essentially a substantially water-insoluble pigment admixed with a dialkyl sulfoxide. The proportions of the pigment to the dialkyl sulfoxides may vary widely, for example, from 0.1 part to 10 parts by weight of pigment for each part of the dialkyl sulfoxide. The dialkyl sulfoxides may be dimethyl sulfoxide, diethyl sulfoxide, dibutyl sulfoxide, methyl-ethyl sulfoxide, methyl-butyl sulfoxide, methyl-decyl sulfoxide and other dialkyl sulfoxides. It is preferred, however, to use lower dialkyl sulfoxides containing up to 8 carbon atoms, particularly dimethyl sulfoxide. These sulfoxides are useful in promoting rapid dispersion of pigment in cement, gypsum, lime, and the like materials. Many substantially water-insoluble coloring pigments have a slight solubility in lower dialkyl sulfoxides. Their coloring efficiency is markedly improved by the dialkyl sulfoxides in respect to dispersion characteristics and color strength development.

The pigment or pigments forming the coloring composition may be substantially water-insoluble and preferably substantially insoluble in dialkyl sulfoxides. The coloring pigments include white, black, gray, as well as spectral colors.

The cementitious materials above referred to may be of numerous compositions but are essentially, before use, finely divided, partly dehydrated compounds having had water of hydration and, in use, are rehydrated and allowed to set. Portland cement, for example, is partly dehydrated when manufactured and in use is moistened whereupon it becomes rehydrated and sets up to a hard material. In making concrete, sand and crushed rock may be added to cement and the whole becomes a more or less uniform, hard, stone-like material. Calcium sulfate similarly, when manufactured, is partly dehydrated and yields a dehydrated powdered material which when rehydrated will set up to a solid mass. Thus such cementitious materials as dehydrated, finely divided Portland cement; dehydrated, finely divided, calcium sulfate hyrate; calcium-aluminate cement; magnesia cement; lime and the like are useful as molding or constructional materials. Other cementitious materials of the type above described may also be used, for example, cement paints, which are to be distinguished from organic paints, and are more nearly in the class of cements.

In order to color such materials, the pigment dispersed in a dialkyl sulfoxide may be incorporated in the finely divided cementitious material, facilitating distribution of the pigment in the mixture and color development.

Cement, plaster and the like materials can be colored by adding the coloring composition to the dry components, or to an aqueous slurry thereof, or to water to be used in making the aqueous slurry. It has been found desirable in certain cases to either add a surfactant to the coloring composition or to dilute the coloring composition with surfactant-treated water before adding same to aqueous inorganic slurries. The pigment-sulfoxide dispersion can be added directly to dry plaster or cement with proper mixing to obtain uniform pigment distribution, using conventional mixing equipment.

The process can utilize a great variety of colorants and associated inorganic extender pigments. Water-insoluble colorants may be reduced to the finest desired particle size, in the presence of dialkyl sulfoxide and introduced into the chosen substrate, thereby providing increased money value of color per unit of weight measure.

It is possible to add other agents to the inorganic cementitious materials along with the pigment-sulfoxide dispersion and gain the same benefit of ultimate or maximum distribution therein due to the presence of dialkyl sulfoxide. Such agents may include accelerators, such as calcium chloride; air-entraining agents, such as oils and soaps; retarders, such as lignin sulfonates or carbohydrate derivatives, and others. Where sufficient dimethyl sulfoxide is included into an aqueous slurry of a substrate, freeze-thaw stability is provided.

In accordance with the process of this invention, a water-insoluble colorant is mixed with a dialkyl sulfoxide or mixture of sulfoxides until a substantially uniform dispersion is obtained. In some cases heating is all that is necessary to achieve a solution or dispersion of the colorant. In other cases, grinding in an appropriate mill must be done to achieve the desired fine particle size.

We have found that addition of a very small amount of pigment will tint the cementitious material. The maximum limit for the amount of pigment will depend primarily on the desired color intensity of the final material. In general, an amount of from 0.01% to about 25%, preferably from 0.1% to 5% of the pigment by weight of the dry cementitious material is satisfactory.

The following examples will serve to illustrate the invention. All parts are expressed by weight, unless otherwise indicated.

*Example 1*

A commercial coating plaster of Paris was weighed out into 100 gram test units. One unit was treated with one gram of a dispersion of 50 parts of medium chrome yellow pigment in 50 parts of dimethyl sulfoxide. Mixing was carried out in a ball mill. Dispersion of color was rapid although the color intensity did not develop until the plaster was dispersed in water, at which time a strong yellow shade developed. Samples of plaster treated with the above-mentioned dispersion were stored 7 days, then prepared as a slurry in water and formed into cube-shaped castings of good dry strength. The castings were sawed through when set and found to contain a uniform distribution of color throughout their body.

*Example 2*

A unit prepared as stated in Example 1 was dispersed as a paste with water and one gram of the same medium chrome yellow pigment dispersion as in Example 1 was added thereto. On stirring, a strong yellow color rapidly developed. Cubes were cast, allowed to set and sawed through. The uniformity of color matched that of the sample described in Example 1.

*Example 3*

A unit prepared as in Example 1 above was colored using 1 gram of an organic color dispersion "Zulu" phthalocyanine blue pigment prepared by heating 20 parts of the pigment in 100 parts of dimethyl sulfoxide at 90° C. for 10 minutes. Color development and dispersion on pasting with water were excellent.

*Example 4*

A unit as described in Example 1 above was colored by incorporating dispersion of Example 3 above to plaster slurry after it was prepared in water. The colored plaster showed excellent color development and dispersion.

The basic composition, however, prepared is generally ready for use without adulterations. When modified further this involves dilution with a liquid, generally a surfactant treated liquid such as water. The process then is simply to combine in one manner or another, the basic composition with the substrate. Examples below will illustrate the process.

*Example 5*

This example relates to the coloring of an aggregate filled concrete. 100 grams of Portland cement was mixed dry with 200 grams of sand and 400 grams of ½–¾" rock aggregate. This was then prepared as a heavy slurry in water. A dispersion of 10 parts of carbon black in 15 parts of dimethyl sulfoxide was prepared on a small laboratory mill. Ten grams of this dispersion was diluted with 10 ml. of water containing 0.2 gram solids of a set control agent, i.e. a ligninsulfonate derivative. The diluted dispersion was added to the concrete slurry. The slurry was allowed to set, then was broken and excellent distribution of color was noted throughout the mass.

*Example 6*

This example relates to the coloring of a commercial, dry powder type white cement paint. 200 grams of the dry powder type paint was prepared into a heavy slurry by the addition of water and stirring. Two grams of a non-ionic type surface active agent was then stirred into the slurry. A coloring dispersion was separately prepared by mixing 10 parts of red iron oxide pigment and 10 parts of dimethyl sulfoxide, heating to 180° F., and sand-grinding for 10 minutes. The resulting dispersion was stirred into the prepared slurry of the cement paint in the ratio of 1 part of dispersion to 10 parts of cement paint, on the dry basis weight of the paint. The resultant pink paint was thinned further with water, and brushed onto an unpainted concrete surface. A similar application was made with a white cement paint. Observation of the dried paints indicated that the films appeared to be similar with respect to adhesion and hardness. Observations were made during the application and drying times of the paints. During application the white cement treated with the dispersion of red oxide, appeared to more readily flow out, resulting in less brush marks in the finished film as compared to the untreated white cement. Drying time of the two was equal. Color uniformity and strength of the paint treated with the red oxide dispersion were excellent.

*Example 7*

A calcium-aluminate cement composed of finely ground limestone and bauxite was colored by adding thereto 2% by weight of a finely ground dispersion of 50 parts of ferric oxide mineral pigment in 50 parts of methyl-butyl sulfoxide. The resulting mixture was mixed with sand and water to form a heavy slurry which was colored uniformly to a rust red. The decorative cementitious composition served as a quick setting mortar for a concrete block wall.

From the foregoing disclosure it will be apparent that the present invention provides an improved process for the manufacture of various colored cementitious products, such as cements, plasters and the like inorganic materials. Due to superior dispersing power of a dialkyl sulfoxide employed as a carrier and a grinding aid for a coloring pigment, finished colored cementitious materials may be prepared easily and rapidly using conventional mixing equipment, such materials being characterized by uniform distribution of the pigment throughout their body.

It will be understood by those skilled in the art that reasonable variations and modifications are possible within the scope of the foregoing disclosure and the appended claims.

We claim:

1. A process for coloring inorganic, finely divided, cementitious materials which comprises incorporating into such material a coloring pigment and a dialkyl sulfoxide in an amount sufficient to produce a substantially uniform distribution of the pigment throughout said material.

2. The process as defined in claim 1 wherein said pigment is substantially insoluble in said dialkyl sulfoxide.

3. A process for coloring inorganic, finely divided, at least partially dehydrated cementitious materials capable of rehydration and setting upon contact with water comprising incorporating therein an intimate mixture of a substantially water-insoluble coloring pigment and a dialkyl sulfoxide in an amount sufficient to produce substantially uniform distribution of the pigment throughout said material.

4. The invention as defined in claim 3 wherein said pigment is substantially insoluble in said dialkyl sulfoxide.

5. A process for coloring inorganic, finely divided, at least partially dehydrated cementitious material capable of rehydrating upon contact with water comprising incorporating therein a dispersion containing from 0.1 to 10 parts by weight of a substantially water-insoluble coloring pigment to 1 part by weight of a lower dialkyl sulfoxide and intimately mixing said material and said dispersion until said pigment is uniformly distributed in said material.

6. The process as defined in claim 5 wherein said pigment is substantially insoluble in said lower dialkyl sulfoxide.

7. A process for coloring, inorganic, finely divided, at least partially dehydrated cementitious material capable of rehydration and setting upon contact with water, comprising incorporating into such material a coloring pigment dispersed in dimethyl sulfoxide, the amount of the sulfoxide being sufficient to produce a substantially uniform distribution of the pigment throughout the material.

8. The process defined in claim 7 wherein said pigment is substantially insoluble in said dimethyl sulfoxide.

9. The process as defined in claim 7 wherein the pigment is employed in proportion from 0.1 to 10 parts by weight for each part by weight of dimethyl sulfoxide.

10. A process for the manufacture of a colored inorganic cementitious material which comprises incorporating into a finely divided inorganic cementitious material a coloring composition consisting essentially of a substantially water-insoluble coloring pigment dispersed in a lower dialkyl sulfoxide, the ratio of the pigment of the sulfoxide being from 0.1:1 to 10:1 parts by weight, respectively, and the amount of the pigment incorporated into said material being from 0.01% to about 25% based on said dry material, and mixing the resulting mixture for a time sufficient to distribute the pigment substantially uniformly throughout said material.

11. The process of claim 10 wherein the dialkyl sulfoxide is dimethyl sulfoxide.

12. The process of claim 10 wherein the amount of the pigment incorporated into said material is from 0.1% to 5%.

References Cited in the file of this patent

UNITED STATES PATENTS

| | | |
|---|---|---|
| 1,972,207 | Tucker | Sept. 4, 1934 |
| 1,972,208 | Tucker | Sept. 4, 1934 |
| 2,069,774 | Reid | Feb. 9, 1937 |
| 2,654,667 | Goodhue | Oct. 6, 1953 |
| 2,787,595 | Webb | Apr. 2, 1957 |
| 2,927,862 | Welch | Mar. 8, 1960 |